United States Patent [19]
Edwards, Jr.; Charles L.

[11] Patent Number: 5,461,970
[45] Date of Patent: Oct. 31, 1995

[54] PECAN CRACKER

[76] Inventor: Charles L. Edwards, Jr., 50 Water St., Tarboro, N.C. 27886

[21] Appl. No.: 364,924

[22] Filed: Dec. 28, 1994

[51] Int. Cl.$^6$ .............................. A23N 5/00; A47J 43/26
[52] U.S. Cl. ................ 99/575; 99/574; 99/579; 99/618
[58] Field of Search ............................. 99/568, 570, 574, 99/575, 579, 577, 581–583, 518, 519, 524, 617–622; 30/120.1, 120.2, 120.3, 120.4, 120.5; 426/481–483

[56] References Cited

U.S. PATENT DOCUMENTS

| | | | |
|---|---|---|---|
| 1,477,262 | 12/1923 | Hayes | 99/619 |
| 1,611,794 | 12/1926 | Vaughan | 99/575 |
| 2,144,841 | 1/1939 | Glaser | 99/574 |
| 2,599,892 | 6/1952 | Brown | 99/618 |
| 4,438,688 | 3/1984 | Johnson | 99/583 |
| 4,526,092 | 7/1985 | Greenblatt et al. | 99/579 |
| 4,608,007 | 8/1986 | Wood | 99/621 |
| 4,819,331 | 4/1989 | Joyama | 30/120.2 |
| 5,024,148 | 6/1991 | Moses | 99/622 |
| 5,076,158 | 12/1991 | Tippett | 99/575 |
| 5,303,470 | 4/1994 | Wakelam | 30/120.2 |
| 5,404,809 | 4/1995 | Ham | 99/579 |

FOREIGN PATENT DOCUMENTS 2356380  1/1978  France ........................... 99/574

*Primary Examiner*—Timothy F. Simone
*Attorney, Agent, or Firm*—Jacobson, Price, Holman & Stern

[57] ABSTRACT

A knurled horizontal roller is journaled for rotation from a mount and a vertically elongated abutment member having upper and lower ends is pivotally supported at its upper end from said mount for angular displacement about a horizontal axis generally paralleling the axis of the roller. One side of the abutment member includes a partial cylindrical surface opposing one side of the roller and yieldable stop structure is operatively connected between the mount and the lower end of the abutment member yieldingly resisting movement of the lower end of the abutment member away from the lower periphery of the roller. The roller may be either rotated by hand through a hand crank operatively connected thereto or motor driven through the utilization of a pneumatic wrench or a variable speed drill, or the like.

10 Claims, 3 Drawing Sheets

PECAN CRACKER

BACKGROUND OF THE INVENTION

1. Field of the Invention

The instant invention relates to a simplified nut cracker including a rotary drive input member adapted to be manually turned or turned through the utilization of a suitable motor and wherein the nut cracker is designed to crack pecan nuts singly fed into the nut cracker.

2. Description of Related Art

Various different forms of nut crackers heretofore have been provided including manually operated nut crackers as well as power driven nut crackers.

Small growers of nuts such as pecan nuts sell, for the most part, their harvest in bulk form and many purchasers of medium quantities of pecan nuts find that it is not economical to also purchase large and expensive power driven nut crackers. Further, manual nut crackers of the lever operated type are not well suited for cracking medium quantities of nuts in view of the time required to singly crack nuts by use of a lever type nut cracker.

Accordingly, a need exists for a manually operated rotary type of nut cracker which may be used to crack pecan nuts as well as other nuts in a reasonably efficient manner. Furthermore, although a simplified rotary nut cracker may be hand driven, the same rotary nut cracker may be powered by a simple gear reduction motor or a hand power tool such as a pneumatic wrench or variable speed drill.

SUMMARY OF THE INVENTION

The nut cracker of the instant invention incorporates a rotary, knurled roller which may be manually driven or driven by a pneumatic wrench or variable speed drill and the like and which is opposed, on one peripheral side thereof, by an arcuate upstanding abutment member opening toward the roller and pivotally supported at its upper end for angular displacement about an axis substantially paralleling the axis of rotation of the roller. The lower end of the abutment is movable toward and away from the roller and resilient stop structure is provided for yieldingly limiting movement of the lower end of the abutment member away from the roller.

With this type of nut cracker, nuts to be cracked may be fed to the nut cracker at the rate of 1 or 2 every second, whereby 60 to 120 nuts may be cracked per minute.

The main object of this invention is to provide a small nut cracker operable by a single person (either manually or through any suitable power means) to efficiently crack nuts such as pecan nuts at a reasonable rate.

Another object of this invention is to provide a nut cracker including structure which will be effective to crack pecan nuts in a manner to minimize damage to the nut meat.

A further important object of this invention is to provide a nut cracker which is reasonably compact and which may therefore be stored in a compact state during periods of nonuse.

Another object of this invention is to provide a nut cracker which may be adjusted so as to be efficient in cracking nuts of different sizes.

A final object of this invention to be specifically enumerated herein is to provide a nut cracker in accordance with the preceding objects and which will conform to conventional forms of manufacture, be of simple construction and easy to use so as to provide a device that will be economically feasible, long lasting and relative trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
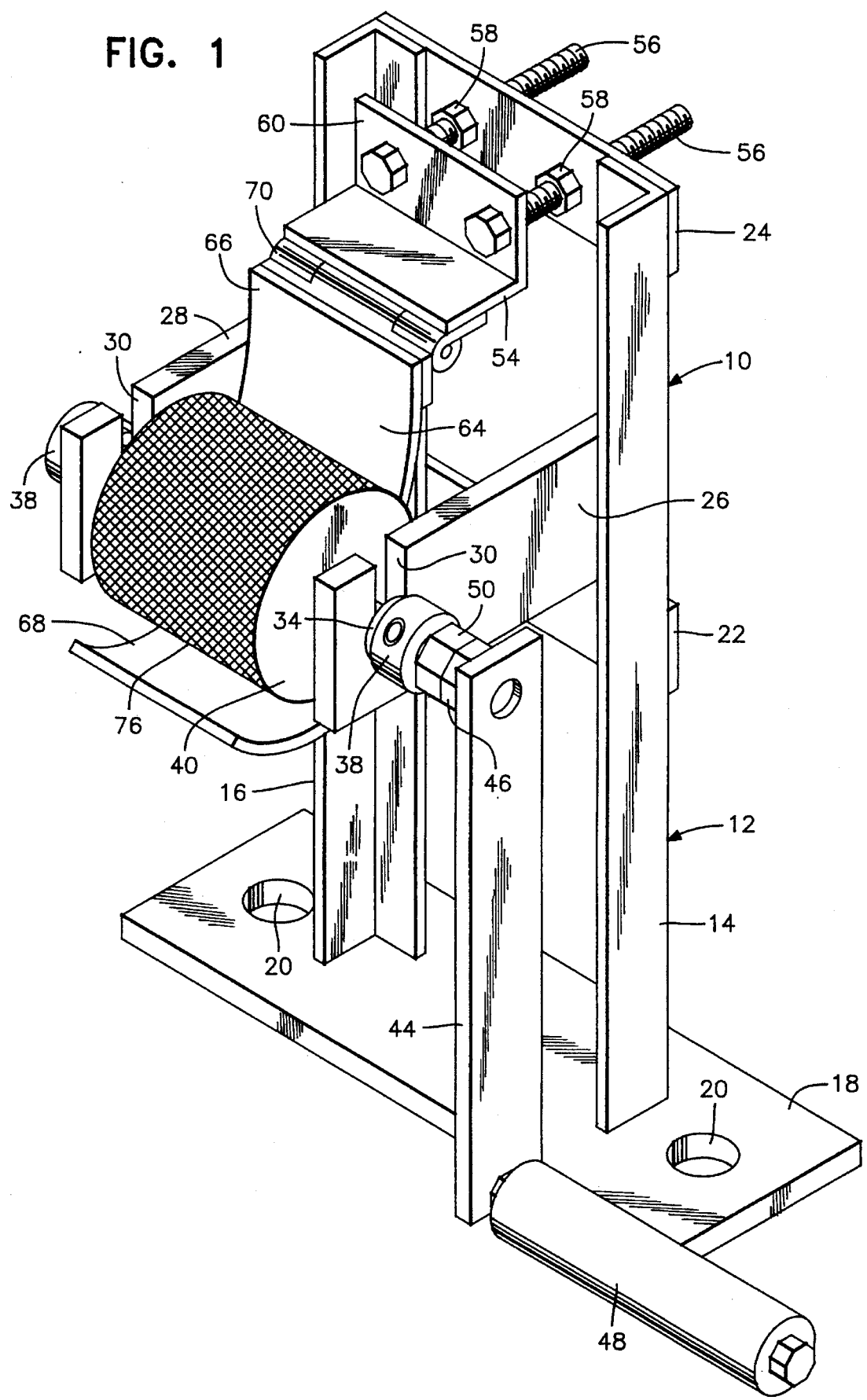
FIG. 1 is a front perspective view of a nut cracker constructed in accordance with the present invention.

Referring now more specifically to the drawings, the numeral 10 generally designates a nut cracker constructed in accordance with the present invention. The nut cracker 10 includes a mount or frame referred to in general by the reference numeral 12 incorporating a pair of upright, parallel angle members 14 and 16 interconnected at their lower ends by a horizontal mounting base plate 18 having a pair of mounting apertures 20 formed therein.

Intermediate height portions of the angle members 14 and 16 are rigidly interconnected by a brace 22 and the upper ends of the angle members 14 and 16 are rigidly interconnected by a similar upper brace 24 extending and secured therebetween in any convenient manner such as by welding.

The angle members 14 and 16 support horizontally forwardly directed support arms or plates 26 and 28 therefrom immediately above the brace 22 and the plates 26 and 28 are edge upstanding and include upwardly opening slots 30 formed therein. The lower ends of the slots 30 include diametrically enlarged counter bores 32 formed therein and shouldered bushings 34 have their diametrically reduced ends seated in the counter bores 32 and rotatably receive the opposite end portions of a support shaft 36 therethrough.

Set screw equipped collars 38 are mounted on the opposite end portions of the shaft 36 immediately outward of the bushings 34 and a centrally apertured roller 40 is mounted on the longitudinal midportion of the shaft 36 between the plates 26 and 28 through the utilization of a pair of nuts 42 tightened against the axial ends of the roller 40 in order to lock the roller 40 to the shaft 36 for rotation therewith.

A hand crank 44 is provided and has an internally threaded nut 46 welded to one end thereof, a laterally directed hand grip 48 being carried by the other end of the hand crank 44. The nut 46 is threaded on one extended end of the shaft 36 outwardly of a jam nut 50 also threaded on the shaft 36 and the nut 50 is threaded tight against the nut 46 in order to secure the hand crank 44 to the shaft 36 for rotation therewith.

If it is desired to rotate the shaft 36 independent of the hand crank 44, the hand crank 44 and its nut 46 may be unthreaded from the shaft 36 and a nut comparable in size to the nut 50 may be threaded on the shaft 36 outwardly of the nut 50 and threaded thereagainst so that the flats of the nut 50 and the outer nut are coplanar. Then, a suitable size socket may be engaged with the nut 50 and its companion nut and turned either through the utilization of a pneumatic wrench head or a variable speed drill (not shown). In any event, means is provided for rotating the shaft 36 at relative slow speeds.

The nut cracker 10 also includes an angle member mount 54 supported from a pair of threaded bolts 56 secured through the brace 24. The bolts 56 are secured to the brace 24 through the utilization of a plurality of locking nuts 58 and the headed end of the bolts 56 are secured through the upstanding flange 60 of the mount 54 through the utilization of jam nuts 62. Thus, it will be noted that the nuts 58 may be loosened, the mount 54 may be shifted horizontally relative to the brace 54 as viewed in FIG. 3 and then the nuts 58 may be retightened against the brace 24. In this manner, the mount 54 may be horizontally adjusted toward and away from a vertical plane containing the axis of rotation of the shaft 36.

An upstanding arcuate abutment member 64 is provided and includes upper and lower ends 66 and 68. A leaf hinge 70 pivotally supports the upper end 66 of the abutment member 54 from the horizontal flange 72 of the mount 54 for angular displacement about an axis substantially paralleling the axis of rotation of the shaft 36, whereby the lower end portion of the abutment member 64 is swingable toward and away from the outer periphery 74 of the roller 40.

The radius of curvature of the abutment member 64 is generally equal to the spacing between the axis of rotation of the shaft 36 and the axis of angular displacement of the angle member 64 as defined by the leaf hinge 70.

The longitudinal midportion of the horizontal brace 22 includes a horizontal bore 76 formed therethrough and a threaded shaft 78 is slidably received through the bore or aperture 76 and has a compression spring 80 loosely disposed thereon forward of the brace 22. A flat washer 82 is disposed between the spring 80 and the brace 22 and between the opposite end of the spring 80 and a thumb nut 86 threaded on the forward end of the shaft 78. The forward terminal end of the shaft 78 includes a horizontally laterally directed portion 88 received through a nut 90 secured to the outer surface of the abutment member lower end portion 68 and a cotter pin 92 is secured through the laterally directed portion 88 in order to releasably secure the later through the nut 90.

Figure 3:
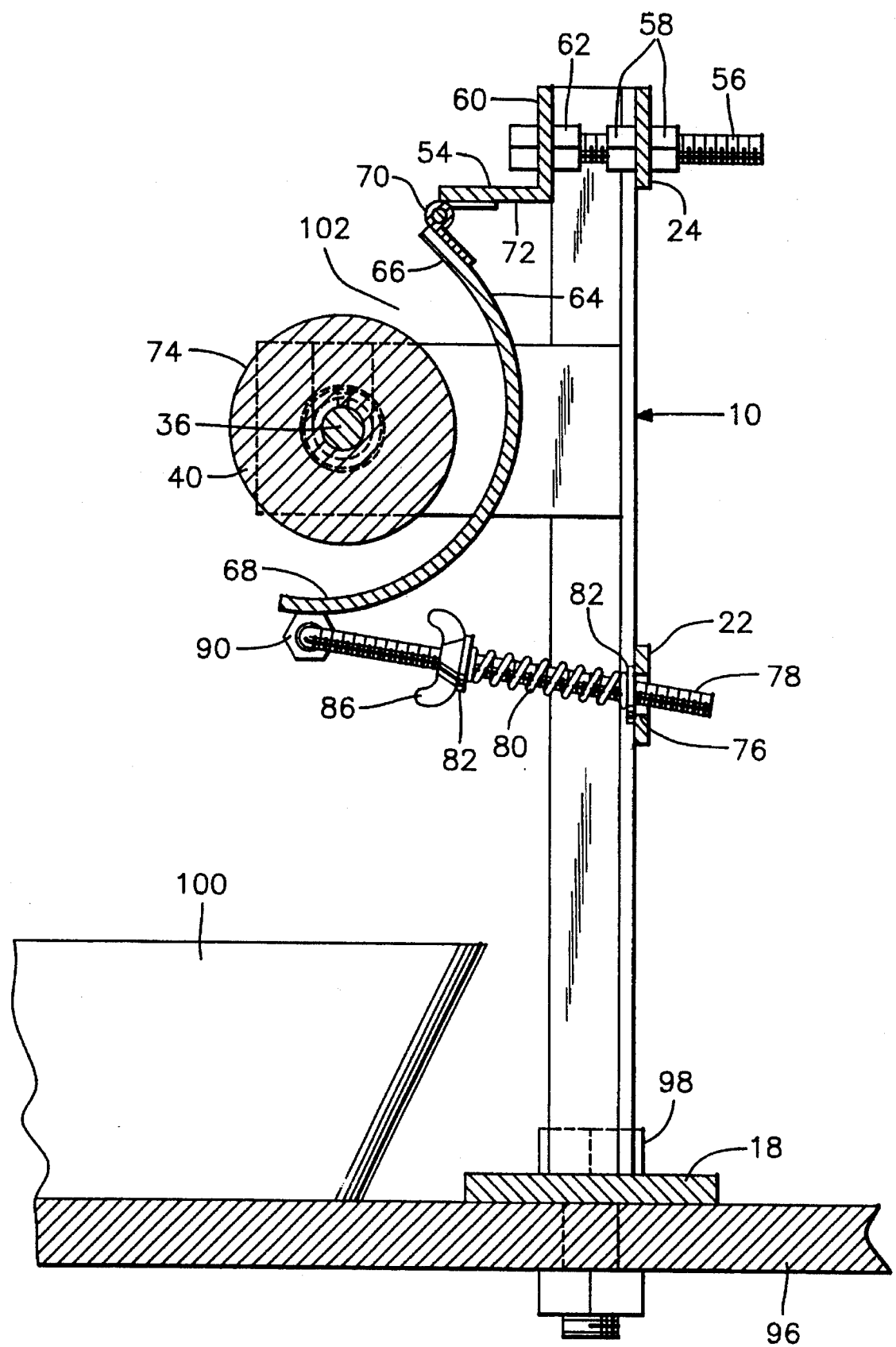
FIG. 3 is a vertical sectional view taken substantially upon the plane indicated by the section line 3—3 of FIG. 2 and illustrating the nut cracker mounted from a suitable horizontal support member.

The base plate 18 may be mounted upon any suitable horizontal support member 96 through the utilization of suitable bolts 98 secured through the apertures 20 and the support member 96 in a manner believed to be obvious from FIG. 3 of the drawings and a suitable receptacle 100 may be placed upon the support member 96 beneath the forward portion of the lower end 68 of the abutment member 64.

Figure 2:
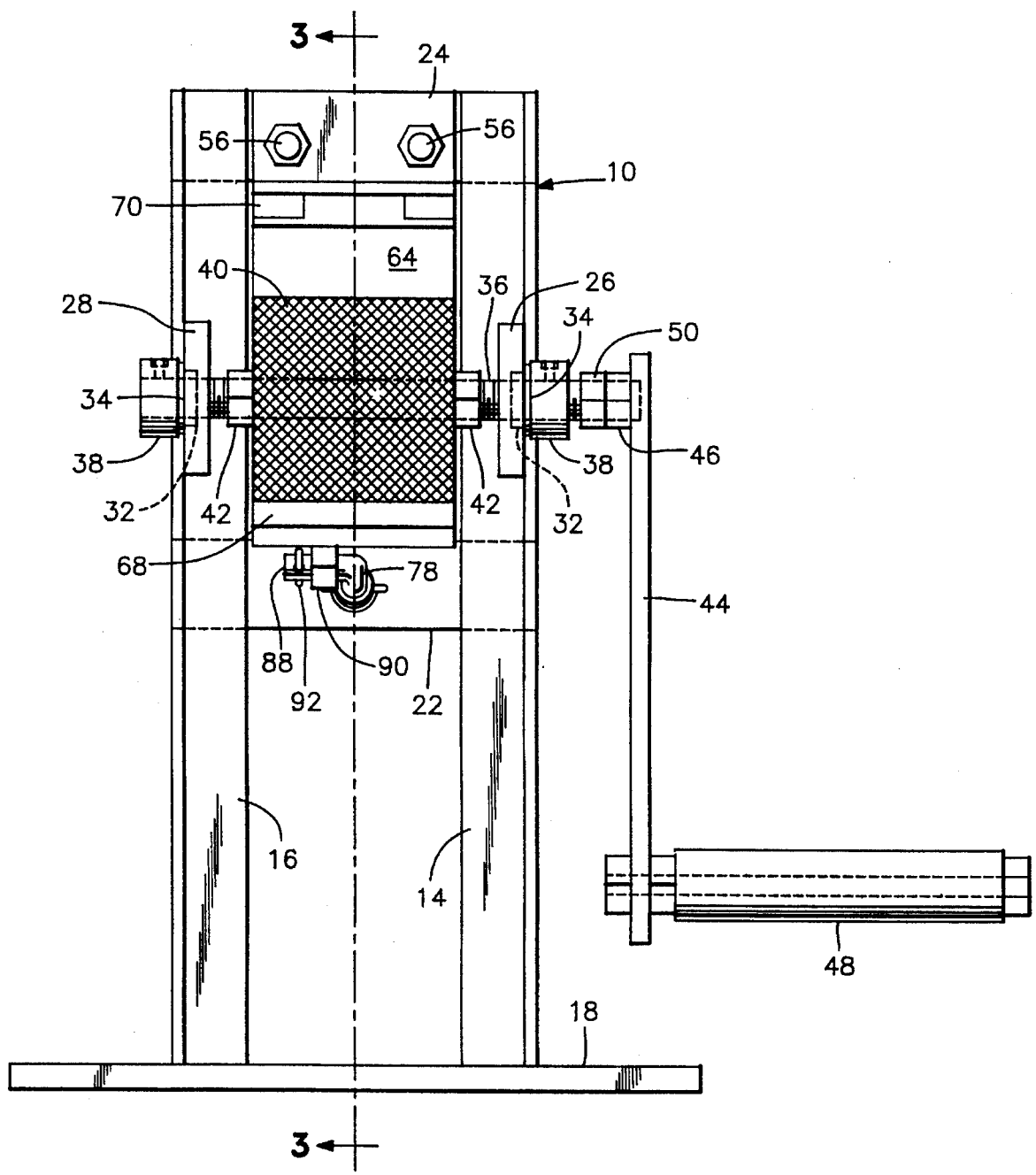
FIG. 2 is a front elevational view of the nut cracker.

In operation, with the nut cracker 10 mounted in the manner illustrated in FIG. 3, rotary torque may be applied to the shaft 36 either by the hand crank 44 or power means hereinbefore described in order to rotate the shaft 36 in a clockwise direction as view in FIG. 3. As the shaft 36 and roller 40 are rotated, individual nuts may be fed into the throat area 102 defined between the upper periphery of the roller 40 and the upper end or end portion 66 of the abutment member 64. The outer periphery 74 of the roller 40 is knurled as shown in FIGS. 1 and 2 and therefore frictionally grips even hard nut hulls or shells such as the hull of a pecan nut and forces the nut downwardly between the roller 40 and the intermediate length portion of the abutment member 64. As the nut is forced downwardly, the knurled outer periphery 74 of the roller 40 causes the nut to rotate about a horizontal axis generally paralleling the axis of rotation of the shaft 36 and therefore completely cracks the outer periphery of the nut hull.

If large nuts are being cracked, the thumb nut 86 may be threaded along the shaft 78 toward the nut 90 so as to provide more spacing between the horizontal midportion of the roller 40 and the vertical midportion of the abutment member 64. Further, according to the type of nuts being cracked, the compression spring 80 may be replaced by a stronger or weaker spring in order to accomplish the desired nut hull cracking operation with minimum damage to the meat of the nuts being cracked.

As the nuts are cracked, they drop from the lower end portion 68 of the abutment member 64 into the receptacle 100. Of course, broken nut shells or hulls as well as nut meats also will be received within the receptacle 100 and thus the broken shell or hull portions must be separated from the nut meats.

The foregoing is considered as illustrative only of the principles of the invention. Since numerous modifications and changes readily will occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A nut cracker including a mount, a roller journaled from said mount for rotation about a first horizontal axis, a generally horizontally opening, vertically elongated and partial cylindrical abutment including upper and lower end portions projecting above and below the upper and lower peripheries of said roller, mounting means pivotally mounting the upper end portion of said abutment from said mount for angular displacement about a second axis generally paralleling and spaced above and to one side of the axis of rotation of said roller and with said abutment member opening toward said roller, the radius of curvature of said abutment member being generally equal to the spacing between said first and second axes, yieldable stop means operatively connected between said mount and lower end portion defining a yieldable stop against swinging movement of said lower end portion in a direction increasing the spacing between said lower end portion and said roller, means operative to impart rotary torque to said roller, said roller including a nut shell gripping outer peripheral surface.

2. The nut cracker of claim 1 wherein said roller is mounted on a rotary shaft journaled from said mount and one end of said shaft includes hand crank means mounted thereon comprising said means operative to impart rotary torque to said roller.

3. The nut cracker of claim 1 wherein said mounting means includes means operative to relatively horizontally adjust said axes.

4. The nut cracker of claim 3 wherein said mounting means includes means operative to horizontally adjust second axis relative to said first axis.

5. The nut cracker of claim 1 wherein said outer peripheral surface is knurled.

6. The nut cracker of claim 1 wherein said yieldable stop means includes means operative to horizontally adjust said stop means relative to said second axis.

7. A nut cracker including a mount, a roller journaled from said mount for rotation about a first horizontal axis, a vertically elongated abutment member including a concave side extending between upper and lower end portions of said abutment member, mounting means pivotally mounting said upper end portion of said abutment member from said mount for angular displacement about a second axis paralleling and spaced above and to one side of the axis of rotation of said roller and with said concave side opening toward said roller, yieldable stop means operatively connected between said mount and said lower end portion defining a yieldable stop against swinging movement of said lower end portion in a direction increasing the spacing between said lower end portion and said roller, and means operative to impart rotary torque to said roller.

8. The nut cracker of claim 7 wherein said mounting means includes means operative to relatively horizontally adjust said axes.

9. The nut cracker of claim 8 wherein said mounting means includes means operative to horizontally adjust second axis relative to said first axis.

10. The nut cracker of claim 7 wherein said yieldable stop means includes means operative to horizontally adjust said stop means relative to said second axis.

* * * * *